Dec. 6, 1966　　J. P. TARBOX　　3,289,859
BALE WAGON
Filed Feb. 27, 1964　　4 Sheets-Sheet 1
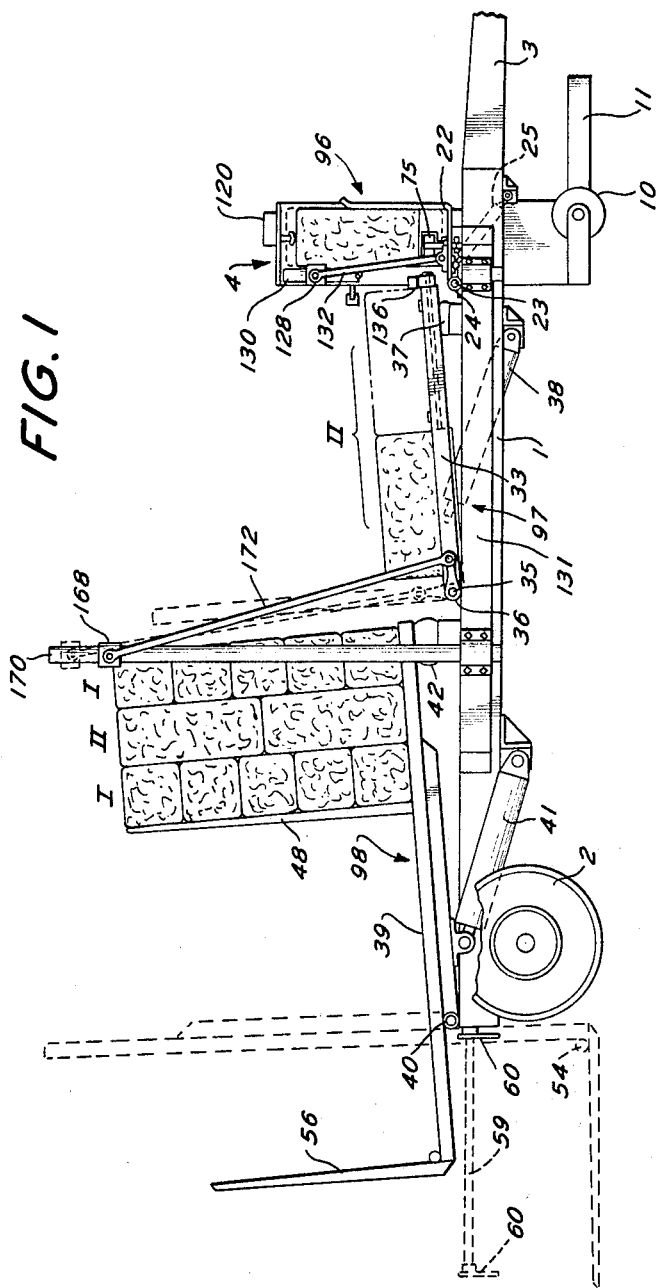
INVENTOR.
JOHN P. TARBOX
BY
Walter V. Wright
AGENT

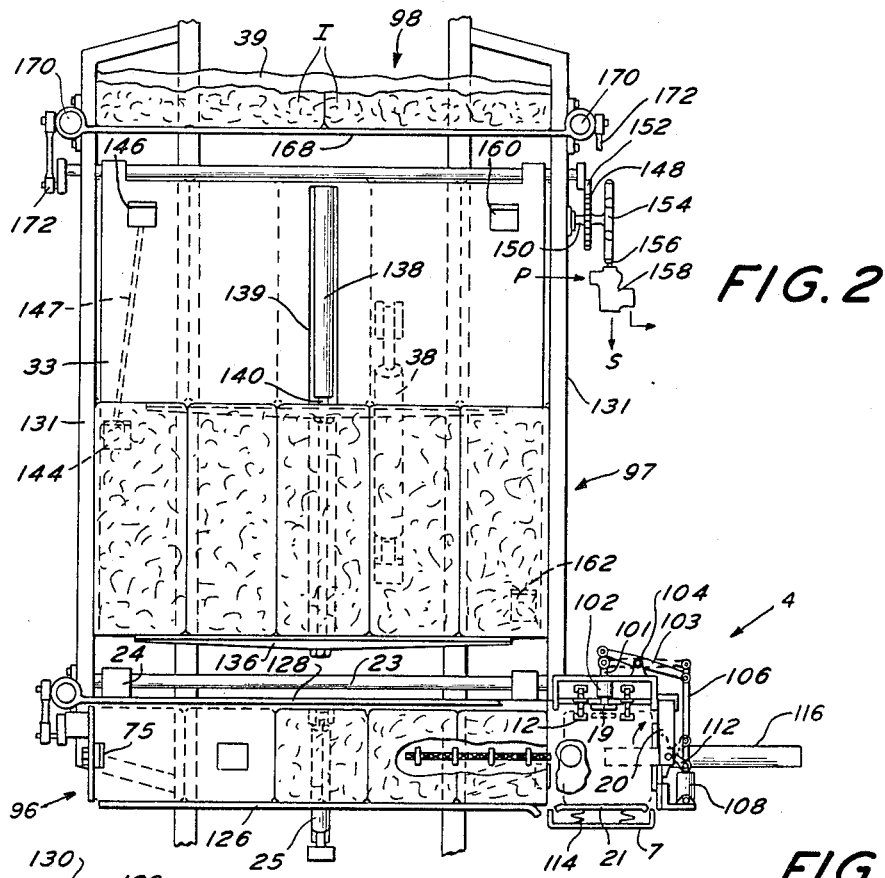

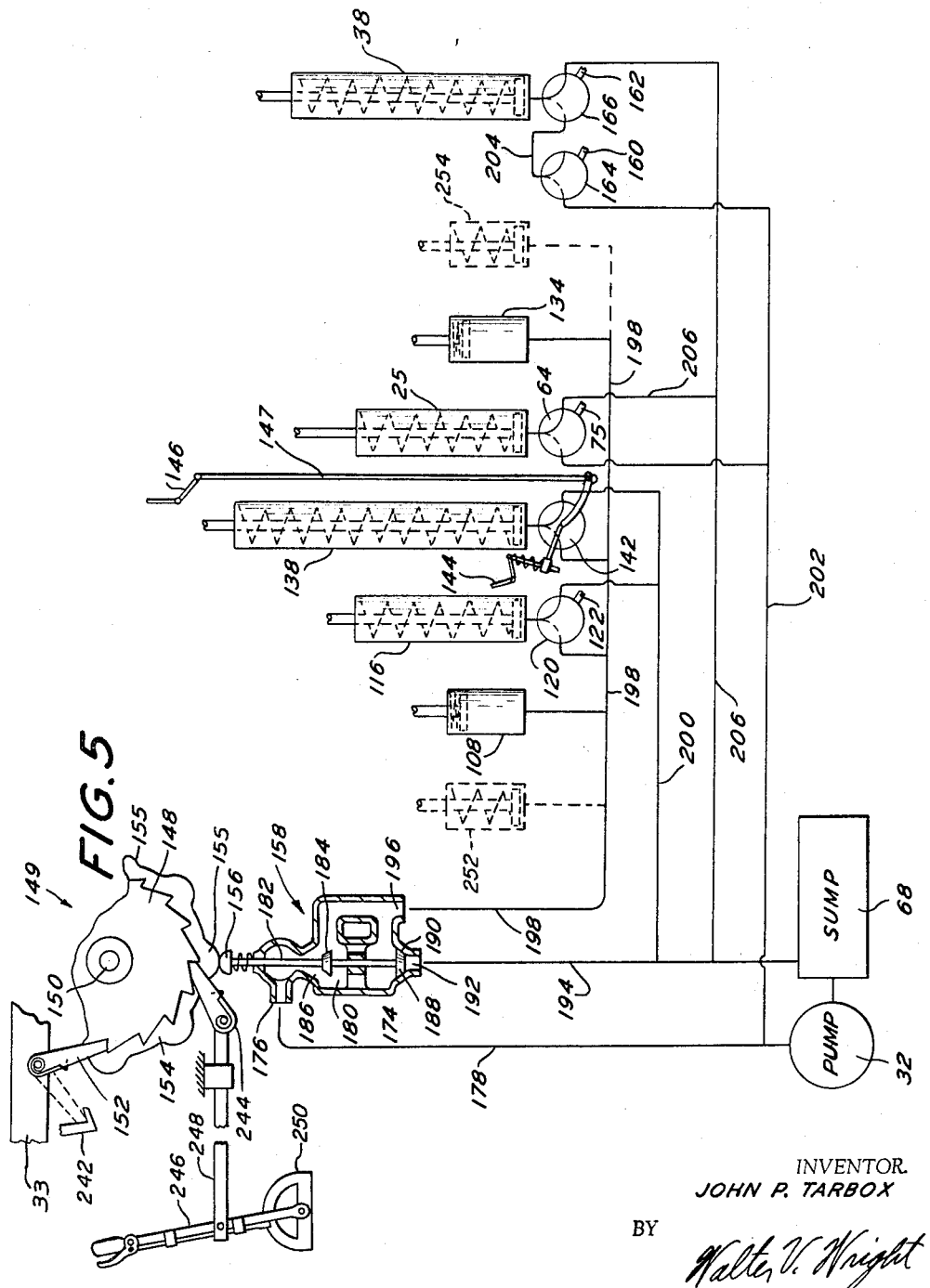

Dec. 6, 1966 J. P. TARBOX 3,289,859
BALE WAGON
Filed Feb. 27, 1964 4 Sheets-Sheet 4
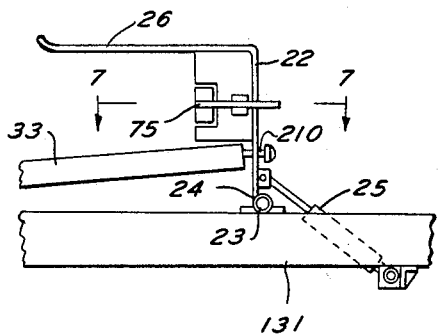
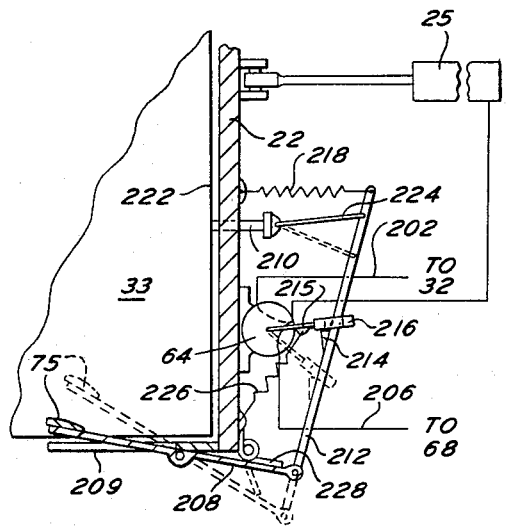
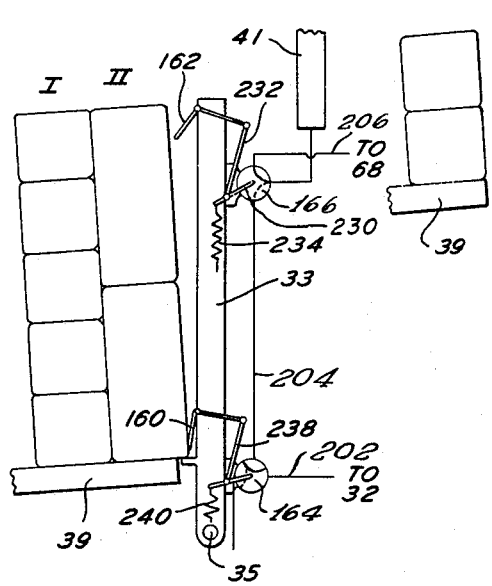
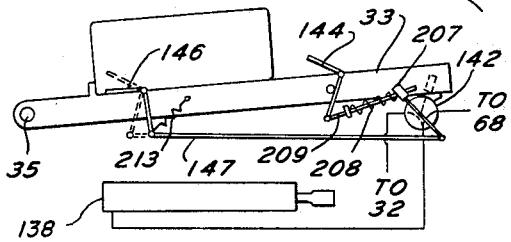
INVENTOR.
JOHN P. TARBOX
BY
Walter V. Wright
AGENT United States Patent Office 3,289,859
Patented Dec. 6, 1966

3,289,859
BALE WAGON
John Preston Tarbox, Philadelphia, Pa., assignor to Sperry Rand Corporation, New Holland, Pa., a corporation of Delaware
Filed Feb. 27, 1964, Ser. No. 347,851
3 Claims. (Cl. 214—6)

This invention is in the art of automatic bale pick-up, truck and ground stacking methods and machines exemplified by the U.S. patent to Grey, No. 2,848,127, issued August 19, 1958; and by my copending application S.N. 275,323, filed April 24, 1963, now abandoned.

*Nature of the invention*

(A) A new method of building bale interlocking ground stacks.

(B) Another automatic bale interlocking system of control for enabling the Grey and like machines to build the bale interlocked ground stack using the method A, considered an improvement upon the systems of the patent and the application above identified.

*Objects of the invention*

(I) A simplified method.

(II) Simplifying, rendering more economical to manufacture, use and maintain, and speeding up the operation of the automatic system of control, especially the latter.

*Means of achieving the objects*

(1) Initially forming rows of bales on end as well as rows on side by adapting the individual bale pick-up and handling and the row handling mechanisms to this purpose.

(2) Adapting the layer mechanism to receive and progress to the load carrying mechanism from one and the same initial receiving position a plural number of the initially formed on-end rows as well as plural numbers of rows of on-end bales.

(3) Controlling the initial forming of each such row automatically from the layer handling mechanism, or at will by hand.

(4) Providing means both to handle and steady against toppling over of both the initially formed rows of bales and the frontal on-end layers of the truck load or stack.

*The drawings*

All showings are to be regarded as diagrammatic, for no attempts to accurately dimension or relatively locate them has been made.

FIG. 1—a side elevation after FIG. 1 of the Grey patent; in both FIGS. 1 and 2 layers of bales on side are numbered I, and those on end are numbered II;

FIG. 2—a plan of the individual bale, row, layer and load carrying (or truck stacking) mechanism after FIG. 2 of Grey but showing only the forward end of the load carrying mechanism, both its rear portion and certain top surfaces of the pick-up and row handling mechanisms being broken away to reveal underlying parts;

FIG. 3—a front elevation after FIG. 5 of Grey, showing only the individual bale (or pick-up) and the row handling mechanism, the top front wall of the pick-up mechanism being omitted to reveal interior parts;

FIG. 4—a side view of the pick-up (the individual bale handling mechanism) in which most of its outer wall has been broken away to better show interior parts;

FIG. 5—a diagram of the automatic and manual control system, in which diagram for simplicity of diagramming and understanding I have used single acting spring and gravity return pistons and rods and two-way valves in lieu of double acting pistons and four-way valves;

FIG. 6—a partial and diagrammatic view showing in side elevation the row handling mechanism and its valve opening tappets in the position which they occupy when a formed row of bales has just been progressed to the row receiving frontal end of the layer handling mechanism;

FIG. 7—a similar partial plan view of the row handling mechanism in the position of FIG. 6 in the form of a greatly enlarged transverse cross section taken approximately on line 7/7 of FIG. 6, and showing diagrammatically the tilting motor of the row handling mechanism, its controlling valve, and the complete tappet mechanism by means of which the valve is actuated;

FIG. 8—A diagram showing one of the dual tappet controlled valving systems of a lengthwise bale row push back mechanism associated with the layer handling mechanism, a row of such pushed back bales being shown in its relationship to the frontal layer of the load carrying mechanism; and FIG. 9—a diagram on a larger scale than FIG. 8 showing the second valving system also associated with the layer handling mechanism, but in this case involving the two valves and their individual tappets which govern the tilting motor of the mechanism.

In these drawings parts the same or having the same general function as those in Grey, bear the same identifying numbers as they do in Grey, even though their structure and function are added to or modified in one respect or another.

*The groups of mechanisms*

4—The individual bale handling mechanism or pickup,
96—The row handling mechanisms,
97—The layer handling mechanism,
98—The truck stack or load handling mechanism.

Modifications of parts used by Grey and additions to the several major mechanisms are cataloged and identified as follows, mechanism by mechanism in the order above numbered.

*The pick-up mechanism—4*

7—The vertical walls of the mechanism. These are extended upwardly sufficiently to enable the vertical raising of a bale on end until its lower end is somewhat above row receiving bed 22 or row handling mechanism 96.

12—The conveyor chains as lengthened upwardly correspondingly,

19—Stripper bar similarly lengthened or raised for the same purpose, while shown here free the bar may be made flexible or else hinged at its lower end, 20—The tipper bar, of the same height and curvature given it by Grey—Grey uses two bars each, 19 and 20. I use but one each and make it wide enough for the functions it is to perform, 21—The guard member, also heightened to engage adequately on end bales, 100—A top wall or frame piece surmounting the side walls 7 for supporting certain added elements, 101, 102—A small rod connected with stripper 19 and its supporting bearing, for withdrawing stripper bar 19 when the pick up is progressing on end bales, the bar being withdrawn to lengthen the engagement of chains 12 sufficiently to enable them to carry an on-end bale vertically upwardly to the top of casing 7, 103, 104, 106, 108—Respectively a lever of the first order, its mounting on the back wall of casing 7, a connecting rod, and an hydraulic motor bracket supported from the outside wall 7 for reciprocating push rod 101, 110, 111, 112—Respectively a rod or shaft-like lower end of the tipper bar 20, its vertical bearing, and a crank connection rod enabling tipper bar 20 to be rotated 90 degrees clockwise when motor 108 is energized, so removing bar 20 from the path of vertically moving on-end bales, 114—Spring mounting for a top front wall 21 section pressing it toward the front sides of bales for better steadying and guiding of bales to the tops of chains 12 and row handling mechanism 96, whether on side or on end, 116—An hydraulic cylinder affixed to the outer side wall of casing 7 and extending outwardly at right angles thereto, 118—An on-end bale push over plate located normally close to the inside of this outer side wall of casing 7 adapted to be pushed by motor cylinder 116 away from the wall and carry before it such on-end bale as is in position to be pushed over onto receiving bed 22 of row handling mechanism 96. The broad area of this plate is centered about the transversely projected center of gravity of such bales when they are at the proper height to be pushed over, 120, 122—Respectively an hydraulic valve and its tappet, the former affixed to the top 100 of casing 7 and the latter extending below the top in position to be struck by the tops of on-end bales to operate its valve whenever such bales reach maximum elevation. The valve (see FIG. 5) controls admission of hydraulic pressure to bale pushover cylinder 116.

The row handling mechanism—96

126—A guard rail or wall erected at the front margin of receiving bed 22 (as is rail 26 of Grey) but raised in height to locate its top above the centers of gravity of a row of on-end bales such as II shown thereon, 128—A rear top guard rail normally in position to be engaged by the tops of the rear sides of bales on-end to steady them as the row is in process of formation bale by bale as pushed over into bed 22, 130—Right and left vertically extending side posts slidably mounting rail 128 for vertical reciprocation of a few inches, and whose lower ends are affixed to outer extensions 131 suitably affixed to chassis 1, 132—Top guard rail operating links pivotally interconnecting at its opposite ends the guard rail 128 and the receiving bed 22 at a distance forward from shaft 23, to move guard rail 128 upwardly such distance as to free the engaged row of on-end bales when receiving bed 22 is tilted rearwardly to transfer such row to transfer bed 33 of layer handling mechanism 97, 134—An hydraulic motor cylinder (see FIG. 3) of a short stroke, a stroke but sufficient to raise receiving bed 22 to free on-end bales placed thereon from danger of engagement by conveyor chain 27 which Grey uses to engage and move over on-side bales.

The layer mechanism—97

136—A transverse row pushing bar of limited height (say from 1 to 3 inches) normally resting at and slightly above the front edge or margin of transfer bed 33 and adapted to be slid rearwardly over its top surface at least bale length, 138—An hydraulic cylinder operating motor for bar 136 having a stroke at least equal to bale length, affixed to bed 33 below its top surface in a full length accommodating slot 139 along the center line of the bed, 140—Piston rod of cylinder 138 connecting with the bar 136 below the top of the bed at the front end of slot 139, 142 and 144 (FIGS. 3 and 2)—Respectively an hydraulic valve affixed to the under side of the bed and its tappet (FIGS. 2 and 5) which latter is to project through the top of bed 33 near the transverse center line and somewhat short of bale length from the front edge of the bed, 146, 147 (see FIGS. 2, 8 and 5)—These are a valve operating lever and its link to valve tappet 144. The upper end of lever 146 projects upwardly several inches above and in advance of the rear edge or margin of bed 33. Link 147 is beneath the bed, 148 and 150—A ratchet wheel and its horizontal mounting shaft which later is affixed to chassis side extension 131, 152—An actuating pawl for the ratchet 148 operated from transfer bed 33 and adapted to advance the ratchet 148 one tooth each time transfer bed 33 transfers a completed layer to carrying bed 39, 154—A valve operating cam turned by the ratchet and as illustrated in FIG. 5 having a camming knob 155 projecting from its periphery opposite every other tooth of the ratchet, 156 and 158—Valve tappet and valve operated by the knob 155 of cam 154, 160 and 162—Valve tappets projecting above the top surface of bed 33 respectively from the rear, near the side of the bed opposite valve controls 144 and 146 and laterally outwardly from the path of bar 136 (as are 144 and 146), 164 and 166 (see FIGS. 5 and 9)—Valves in series affixed to bed 33 and operated respectively by the tappets 160 and 162.

The load carrying mechanism—98

168, 170, 172—Respectively layer front top margin guard and steadying rail, mounting rods for the same, and operating linkage to the transfer bed 33, arranged to function in connection with the succesive frontal layers of the stack in substantially the same manner as do the top guard rail 128 and its associated elements of the row handling mechanism 96 above recited.

The interlocking control system 174 (see FIG. 5)—The casing of valve 158 operated by ratchet 148 through its knobbed cam 154, 176—The hydraulic pressure inlet connection of the casing, 178—Its connection to the hydraulic pump 32 or other source of power, 180—The inner chamber of the valve, 182—Valve stem connecting with tappet 156, 184 and 186—Inlet disc valve on stem 182 and coacting inlet port, 188 and 190—Outlet disc valve on stem 182 and its coacting outlet port, 192—The outlet connection of chamber 180, 194—An hydraulic line connecting outlet 192 with sump 68, 196 and 198—Pressure connection and hydraulic line directly to cylinders 108 of pick up mechanism 4 and 134 of receiving bed 22, and by way of their respective valves 120, 142 and 64 to tilting cylinder 116 of pick-up mechanism 4 and row pushing bar cylinder 138 of layer transfer bed 33, 200—A direct conection from valves 120 and 142 of cylinders 116 and 138 to sump 68, 202—A pressure connection from source of power 32 directly to the control valve 64 of tilting cylinder 25 of row mechanism 96 and its bed 22 and to series valves 164 and 166 of tilting cylinder 38 of transfer bed 33, 204—The series pressure connection between valves 164 and 166, 206—A direct to sump connection from valve 64 of tilting cylinder 25 and valve 166 of tilting cylinder 38.

More details of the parts cataloged above will be described in connection with the description of the operation at large which now follows.

The operation

At the outset note that chamber 180 of valve 158 is shown in FIG. 5 open to pressure, one of the cam knobs 155 having depressed its tappet 156 and so closed port 190 and opened pump pressure port 186. Line 198 is therefore pressurized. Cylinders 108 and 134 have both been activated. Cylinder 108 has turned bale tilting bar 20 to the outside of casing 7 and moved deflector bar 19 rearwardly both as shown in full lines in FIG. 2, so freeing casing 7 for the vertical raising of received bales to its top 100. Cylinder 134 has raised bed 22 slightly above conveyor chain 27, so freeing the bed for bale by bale traverse of bales on end. The remaining master cylinders 116, 138, 25 and 38 are shown as non-activated and connected through their respective valves 120, 142, 64 and 166 to sump lines 200 and 206.

With the exception of valve 142, the tappet connections are symbolized in FIG. 5 by projecting stubs of valve operating levers numbered as are the tappets whose relative locations are shown in FIGS. 1–4. In FIGS. 6–9 they are shown in diagrammatic detail with additional numberings to which reference will duly be made. Tappet 122 of valve 120 of motor 116 (see FIGS. 3 and 4) is a valve stem tappet as is tappet 156 of valve 158 of FIG. 5. The actuating tappet 75 of tilting motor 25 of bed 22 (see FIGS. 6 and 7) is a lever of the first order as may be seen at 208 in FIG. 7, while its deactivating tappet 210 is a push rod which engages the front end of transfer bed 33 when a row of bales is discharged. The remaining four tappets 144, 146, 160, 162 together with their controlled valves are identified with and mounted upon transfer bed 33, and each tappet is in the form of a bell crank connected by certain linkage with its valve, as clearly shown in FIGS. 8 and 9 presently to be described.

In the action illustrated by the drawings at large, the formation of a layer II of bales to be erected on end on carrying bed 39, is shown in process. This process is instituted whenever a knob 155 of cam 154 (FIG. 5) engages and holds open to pressure, valve 158. In FIGS. 2 and 3 three bales of a row of five are shown in full lines on receiving bed 22 of row mechanism 96. In FIG. 2 a complete row of on-end bales is shown as just having been laid on bed 33 of layer mechanism 97 by row mechanism 96, and in FIG. 1 this same row is illustrated as having been moved to the rear of table 33 by push bar 136. This layer when completed as indicated by the dotted lines will be a layer of type II. Three truck erected stacks of bales are shown in FIG. 1 as already erected upon table 39 of load carrying and ground stack erecting mechanism 98, the outer of the layers numbered I being comprised of on-side bales.

Taking up the operation at this stage, observe that the moment the left hand bale of the full line row of FIG. 2 dropped completely to the upper surface of the bed 33; bell crank tappet 144 was depressed to the floor of bed 33 and valve 142 was opened. This the tappet did by applying pressure to valve lever 207 (see FIG. 8) by way of spring 208 carried upon link 209 which itself has a through sliding lost motion connection with one end of valve lever 207. Once valve 142 was so opened, cylinder 138 was activated and carried its push bar 136 from the solid line position to the dotted line position shown in FIG. 2, thereby pushing the first row of layer II bales all the way to the rear of bed 33 as shown in dotted lines in FIG. 2 and in full lines in FIG. 1. Just as the fore end of the left hand bale reaches or nears the rear of the bed the rear end of the bale passes beyond tappet 144, releasing it to be moved upwardly under pressure of spring 208 (FIG. 8). The fore end of the bale at or near the same time depresses bell crank tappet 146, so reversing valve 142 by way of a long link 147 extending beneath the floor of bed 33 and directly connecting with the opposite end of valve lever 207, overcoming spring 208 should tappet 144 be incompletely released. Motor 138 thus becomes connected once again to sump line 200 and bar 136 is returned to its normal frontal position shown in solid lines in FIG. 2. Tappet 144 being near the outer margin of bed 33 and beyond the outer end of fore shortened bar 136 it does not interfere with return of the bar. Nor does the left bale of the second row nearing completion in the row mechanism 96 again open valve 142 for the pressure of spring 208 when 144 is depressed the second time, is insufficient to overcome the weight of the left bale of the first row as it rests upon tappet 146.

Both the fourth and fifth bales needed to complete the row being formed on bed 22 (see FIGS. 2 and 3) as they are erected to uppermost vertical position by conveyor 12 of pick-up mechanism 4, engage tappet 122 of valve 120 as did the preceding three bales of the row. Upon each such engagement valve 120 is opened, on-end bale push over motor 116 is activated, and push plate 118 engages the sides of the bales one by one and pushes them successively onto and along the floor of bed 22. In each case as soon as the top of the bale has left tappet 122 (which it will be noted in FIG. 3 is very near the extreme left side of top 100) spring retracted valve 120 closes so deactivating motor 116 and allowing its spring to withdraw push plate 118 to its normal position at the right.

The row in process of formation being completed with the pushing of the fifth bale onto bed 22, the first bale now actuates tappet 75 of valve 64 to its full line position of FIG. 7. This results in opening valve 64 so activating row tilting or dumping motor 25 (FIG. 6) and dumping the second row of on-end bales upon bed 33 with their fore ends adjoining the rear ends of the row already there, as shown in dotted lines in FIG. 1. Tappet 75 is pivoted to bed 22 and extends through an aperture in end wall 209 of the bed as shown in FIG. 7. Its lower end connects by a lost motion trigger link 212 extending through an elongated aperture (shown in dotted lines, FIG. 7) in the enlarged end 216 of the valve lever 215. On its upper side it bears a trigger 214 which engages and actuates valve lever 215 when lever 75 moves the link to the right. The link 212 is biased upwardly by spring 218 connecting it with the under side of the bed 22, so biasing trigger 214 always upwardly to actuatingly engage the valve lever as it is moved to the right by tappet 75. When bed 22 has been tilted substantially to the vertical position the forward end of pin 210 which projects through bed 22 a distance, engages the frontal face 222 of bed 33 and through a connecting link 224 pushes the spring biased trigger link 212 outwardly, so tripping the trigger 214 and releasing valve lever 215 for return to its normally closed position under the urge of valve lever spring 226 as shown in dotted lines. In this position tilting motor 25 is deactivated as indicated in FIGS. 5 and 7 and table 22 is returned by spring and gravity action to the position shown in FIGS. 1–3 for the receipt of the next row to be formed. In the meantime, as soon as tappet 75 leaves the surface of the left hand bale now on bed 33, tappet 75 and links 212 and 224 have been returned to their normal position as shown in dotted lines in FIG. 7 by bow spring 228, and trigger 214 (whose upper surface is inclined to permit its free return) once more engages behind valve lever 216, ready to actuate it.

Returning now to the operations of layer mechanism 97, upon the dumping of the second row upon it by row mechanism 96 bell crank tappet 162 located near the right hand margin of bed 33 and nearer its front end by a distance less than bale width is actuated (see the showings in FIGS. 2 and 9) to depress the rearwardly and upwardy inclined arm of the bell crank to the floor of bed 33. Pushing valve lever 230 (FIG. 9) of valve 166 through link 232 and against return spring 234 this opens valve 166 to series connection with valve 164 by way of the line 204, so connecting them both directly to pressure line 202. Valve 164 will have already been moved to open position by one of the bales of the first row laid on bed 33 by tappet mechanism 160, 238, 240 in all respects similar to tappet mechanism 162, 232, 234 just described. Thus (FIG. 1) tilting motor 38 becomes activated to progress the completed layer of five lengthwise pairs of end-to-end bales to the truck load as the second stack of type II of bales on-end, and the fourth and now frontal truck stack of the load. Due to the rearward and downward incline of carrying bed 39 and the rearward throwing action of bed 33 as it reaches to, near or slightly beyond vertical position (see FIG. 9) the topmost bales of this on-end stack leave the top of bed 33 several inches. This movement away from bed 33 releases tappet 162 which allows valve spring 234 to close valve 166 cutting off hydraulic pressure from tilting motor 38 and reconnecting it directly to sump line 206 (see FIG. 5). Transfer bed 33 promptly returns to its normal near horizontal position ready to receive the next layer of bales. Tappet 160 of valve 164 is released as bed 33 moves away from its near vertical position and valve 164 also becomes closed, all as shown in FIG. 5.

The frontal bale guiding wall 126 of row handling mechanism 96 extends to a height more than half bale length (well above the center of gravity) and so prevents bales on-end from toppling forward as row mechanism 96 progresses them to layer mechanism 97. In each the row handling mechanism 96 and the load handling mechanism 98 the uppermost margins of the bales which respectively compose the rows and the stacks are steadied against toppling in the one case rearward and in the other case forward by the bars 128 and 168 respectively. These bars are raised by the raising of the beds 22 and 33 high enough to permit in the one case the steadied row and in the other the next layer to pass freely under them. The return of the beds to their normal positions returns the bars to bale steadying positions.

The return to normal positions of the beds 22 and 33 and the steadying bars completes the cycle of the formation and erection of a truck load stack II. The return of bed 33 to its normal position actuates pawl 152 (FIGS. 2 and 5) to move ratchet 148 one tooth forward, so removing the hump 155 of cam 154 from tappet 156 of valve 158 and enabling the valve spring about stem 182 to close pressure port 186 and open port 190 and convert pressure line 198 to a sump line. None of the motor cylinders 108, 116, 138 and 134 will now be activated until ratchet 148 is again advanced and valve 158 again opened. Cylinders 108 and 134 under pressure immediately discharge to sump via line 198. The bale tipper bar 20 and stripper bar 19 on the pickup (see FIGS. 2, 3 and 4) are returned to their dotted line positions as is also bed 22, so conditioning both mechanisms to progress bales on-side instead of on-end, and the next bale picked up by mechanism 4 will institute a cycle of operation which will end in the erection of a truck stack I of on-side bales upon load carrying bed 39 adjoining the preceding truck stack II.

The bale instituting this new cycle and the one which follows it will be tilted by curved bar 20 (FIG. 3) and progressed to bed 22 on their sides by engagement of their under sides with conveyor 27, and the row comprised of the two of them will be pushed over the floor of bed 22 until valve tappet 75 is actuated. This is the standard operation of the Grey machine. At this point, however, activation of tilting motor 25 is taken over by the operation of its control valve 64, not by the mechanism of Grey's FIG. 10 but by the mechanism I have shown in FIGS. 6 and 7 as described above. The formed row of the two bales on-side is thus immediately dumped onto layer transfer bed 33 and receiving bed 22 returns to position to receive a second row. Tappet 162 (see FIGS. 2 and 5) is depressed by the right hand bale and valve 166 connects motor 41 to valve 164, but valve 164 is not yet opened. This action continues as in Grey until five such rows are deposited on bed 33. The deposit of the fifth row then pushes the first row into engagement with tappet 160 which opens valve 164 and admits pressure from line 202 through the already open valve 166 to tilting motor 38. The five rows of outside bales will be resultingly erected as a truck stack type I adjoining the preceding stack II and bed 33 is returned to its normal position as in the case of the No. II stack cycle previously described, the controls of tilting motor 38 operating in the same manner as for stack II. The difference between the two cycles of the layer mechanism 97, that for stack II and that for stack I, is that push back motor 138 and bar 136 remain idle since 138 is cut off at valve 158. Tappet 160 is not actuated until the last of the five rows of on-side bales pushes the first row all the way to the rear of layer bed 33. Stack steadying bar 168 acts on stack I in the same manner as on stack II.

Return of bed 33 to normal once more sets up the conditions for a bales on-end cycle by rotating the next hump 155 into engagement with tappet 156 of valve 158 and restoring pressure to line 198.

Hand control may be substituted at any time for the automatic control of my system by hand lifting pawl 152 from ratchet 148 to a position in which it can be held out of engagement by a latch such as 242 (FIG. 5), and actuating ratchet 148 by a second pawl 244 operable from the operator's position on the vehicle by means of a normally latch locked lever 246 linked to pawl 244 by an elongated bar or rod 248 borne near pawl 244 by a chassis frame supported bearing 250. By such means any desired relative numbers of No. I stacks and the intervened No. II stacks may be formed at will.

By simple spacing cam knobs 155 a greater number of ratchet teeth apart or lengthening knobs 155 beyond the span of one tooth in a substitute cam 154, the same end can be reached automatically.

Many other modifications of or additions to my control system at large may be made without departing from its generic spirit. If desirable for practical reasons a separate motor such as 252 (as shown in dotted lines in FIG. 5) may be used to retract stripper bar 19 of the pick-up mechanism 4 instead of the connecting linkage to motor 108. A motor 254 as shown dotted in FIG. 5 may be used to control the conveyor drive and so prevent it from moving while bales on-end rows are being formed, so saving the power required to run it while rows of bales are being formed. Grey's devices for controlling the tilting motor 25 of row mechanism 96 may be used instead of the devices I have diagramed in FIGS. 6 and 7 if four-way valves and double acting motors are used in lieu of the single acting motors and two-way valves shown. Substitution of such motors and valves for the latter may also render it feasible to use Grey's control device for tilting motor 38, provided due provision is made for the prior actuation of row push back motor 138 and its bar 136, and a series valve control be substituted for Grey's single valve controls. Likewise other forms and types of both actuating motors and sources of power may be used.

For the details of the elements of Grey's mechanisms and their functioning not affected by the modifications and substitutions of my control system, reference may be had to the Grey patent.

Other sizes of bales and other numbers of rows of bales and bales in a row may be built into the stacker of my invention by correspondingly altering the dimensions of mechanisms 4, 96, 97 and 98. So in all such mechanisms appropriate allowances need to be made for normal bale length tolerances. Likewise bales may be picked up by mechanism 4 and placed on bed 22 thickness side down instead of width side down and progressed through the machine merely by appropriate dimensional changes of the mechanism 4 and the successive beds. The drawings illustrate receipt by the bed 22 of bales width down and cut sides front with the ultimate result that the ground stack will be built with the width of bales presented to the sides of the stack and thickness cut or thickness sides of bales down. Placement of bales on bed 22 with cut side down will result in a ground stack composed of layers of bales whose width surfaces lie in transverse planes and whose cut sides are exposed to the weather on two of the outer sides of the stack.

All modifications of my control system invention by means functionwise the equivalents of those I have disclosed herein, are intended to be covered by the annexed claims, irrespective of what may prove to be inapt terminology in view of my present lack of knowledge of what these modifications may prove to be.

What I claim is:

1. A machine of the character described comprising in a bale progressing series four bale handling and progressing mechanisms adapted to progress bales from preceding to succeeding mechanisms of the series: the first mechanism being for individual bales, the second mechanism being for rows of bales, the third mechanism being for layers of bales comprised of a plural number of rows, and the fourth mechanism being for stacks of bales comprised of multiple layers; said first mechanism including means for selectively upending bales to two different heights, means for turning bales on side from the lower height to on side positions, means for pushing bales from the upper height over to the second mechanism without changing their up ended attitude, and means for freeing bales from said up ending means before movement to the second mechanism; said second mechanism including two separate means for preventing the toppling over of bales on end, the one from toppling toward its front and the other from toppling toward the rear, conveying means for on sides bales, and means to progress rows to said third mechanism; the third mechanism including a row pushing device adapted to push a row of bales rearwardly to accumulate a layer of rows of bales, means to progress layers to the fourth mechanism, a layer counting device which counts layers progressed to the fourth mechanism by the third, and means activated by said layer counting device controlling (a) means for preventing action of said conveying means of the second mechanism, (b) said turning means and said pushing means of the first mechanism, (c) said row pushing device of the third mechanism, and (d) said row and layer progressing means of the second and third mechanisms respectively.

2. A bale wagon comprising: a chassis structure; a receiving bed, a transfer bed and a load carrying bed arranged in tandem on said chassis structure with said transfer bed in front of said load-carrying bed and said receiving bed in front of said transfer bed; mechanism on said chassis structure to receive individual bales and deposit them in a row on said receiving bed across the front of said chassis structure; said receiving and depositing mechanism comprising selectively operable means for depositing a row of bales on said receiving bed with the individual bales of said row lying on their sides, and selectively operable means for depositing a row of bales on said receiving bales with the individual bales of said row standing on their ends; control means for selectively operating said bale on side depositing means and said bale on end depositing means; means for delivering rows of bales from said receiving bed to said transfer bed to form a layer of bales thereon; means for moving the first row of each layer formed from bales deposited on end rearwardly on said transfer bed at least a bale length prior to delivery to the transfer bed of the second row of the same layer; and means for delivering layers of said bales to said load carrying bed to form a stack of bales thereon with the individual bales of the layers formed from rows of bales deposited on their sides extending transverse to the individual bales of the layers formed from rows of bales deposited on their ends thereby providing a sturdy bale interlocked stack.

3. A bale wagon as recited in claim 2 including: means engaging bales deposited on end on said receiving bed to steady said bales against tipping; and means engaging the forwardmost layer of bales on said load carrying bed to steady said layer against tipping.

References Cited by the Examiner

UNITED STATES PATENTS

| Re. 25,750 | 3/1965 | Adams et al. | 214—520 |
| 2,702,131 | 2/1955 | Leupke | 214—6 |
| 2,848,127 | 8/1958 | Grey | 214—510 |
| 2,980,265 | 4/1961 | Johnson et al. | |
| 2,997,187 | 8/1961 | Burt | 214—6 |

OTHER REFERENCES

New Holland Haro-Bed Automatic Bale Wagon, December 1962, 4 pages.

GERALD M. FORLENZA, *Primary Examiner.*

J. E. OLDS, *Assistant Examiner.*